United States Patent [19]

Alexander

[11] Patent Number: 4,991,522
[45] Date of Patent: Feb. 12, 1991

[54] AGRICULTURAL PLANTER AND COVER APPARATUS

[76] Inventor: Matthew Q. Alexander, RR #1, Box 104, Delavan, Ill. 61734

[21] Appl. No.: 484,999

[22] Filed: Feb. 26, 1990

[51] Int. Cl.⁵ .................... B60P 7/04; E04H 15/06
[52] U.S. Cl. .................... 111/200; 296/98; 135/903; 135/88
[58] Field of Search .................... 296/98, 100, 136; 135/903, 89, 90; 111/24, 63, 200, 925

[56] References Cited

U.S. PATENT DOCUMENTS

| Re. 31,746 | 11/1984 | Dimmer et al. | 296/98 |
| 1,567,536 | 12/1925 | Miller | 111/200 X |
| 2,591,186 | 4/1952 | Neitzke | 296/98 |
| 4,484,777 | 11/1984 | Michel | 135/903 X |
| 4,691,957 | 9/1987 | Ellingson | 135/903 X |
| 4,915,439 | 4/1990 | Cramaro | 296/98 |

FOREIGN PATENT DOCUMENTS 1128639  1/1957  France .................... 296/98

*Primary Examiner*—Danton D. DeMille
*Attorney, Agent, or Firm*—Jean Gilden

[57] ABSTRACT

An apparatus including an agricultural planter, including a plurality of rotatable wheel members and an overlying support surface for securing a series of seed containers thereon. The apparatus includes a flexible impermeable cover web extending from a rear end framework member of the planter to overlie the planter and the associated containers. Flexible side flaps are provided preventing moisture and debris from entering the seed containers laterally thereof.

10 Claims, 4 Drawing Sheets

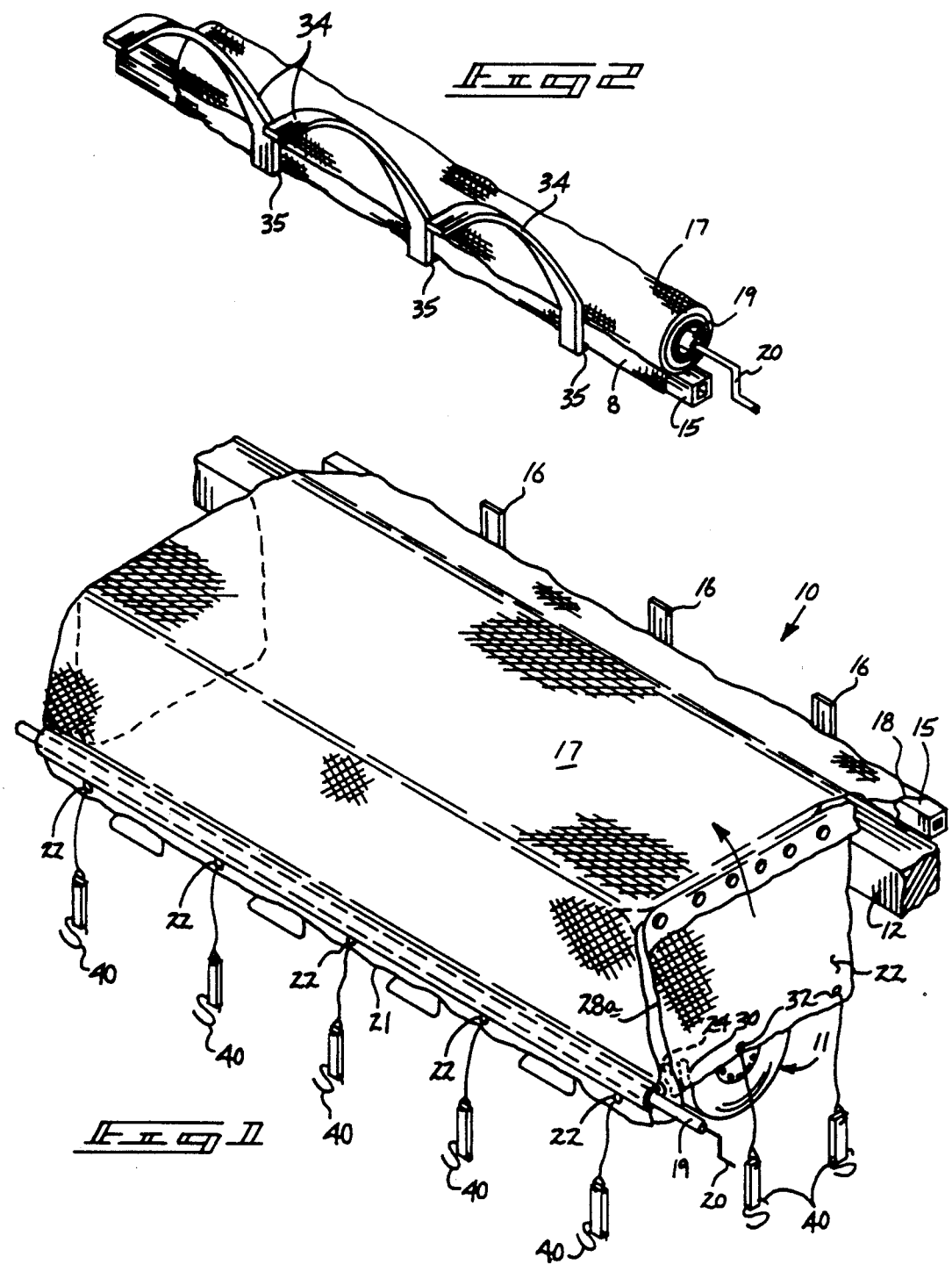

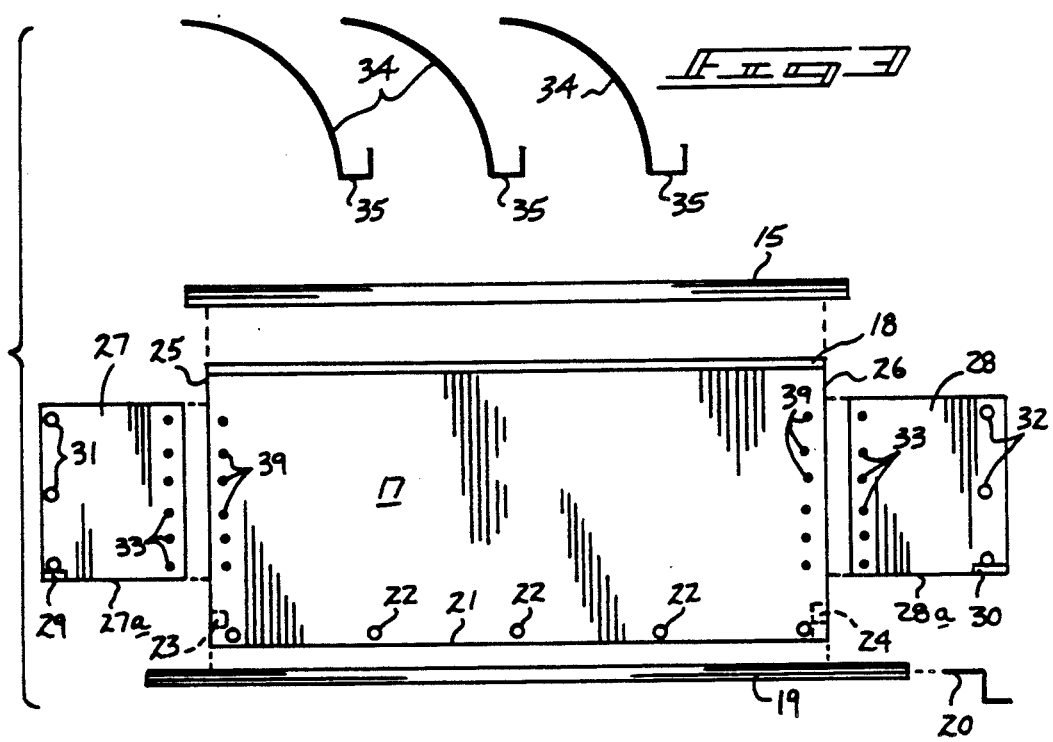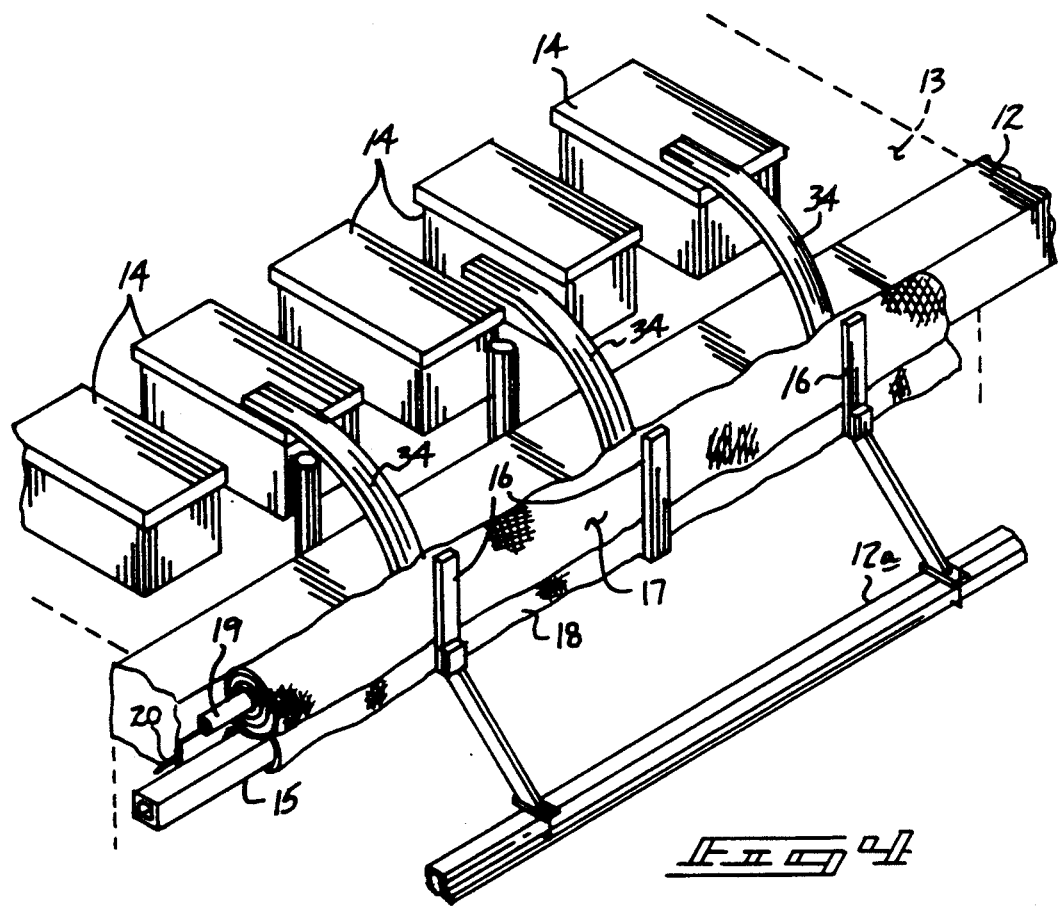

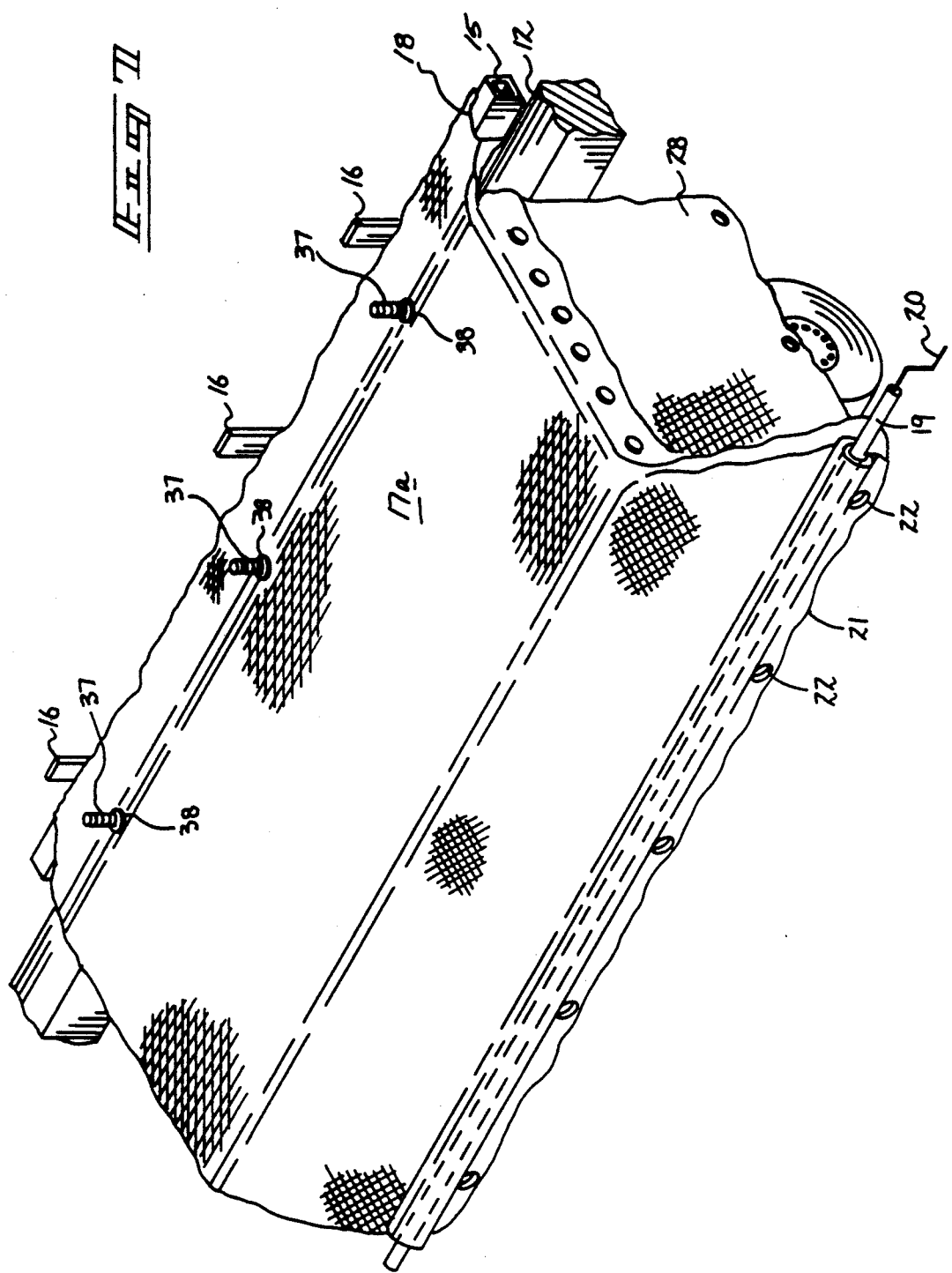

AGRICULTURAL PLANTER AND COVER APPARATUS

BACKGROUND OF THE INVENTION

1. Field of the Invention

The field of invention relates to agricultural planters, and more particularly pertains to a new and improved agricultural planter and cover apparatus wherein the same permits selective covering in an overlying orientation of a flexible web to prevent moisture and debris from contaminating seed containers contained within the planter organization.

2. Description of the Prior Art

Agricultural planters are utilized extensively throughout the prior art, and are typically drawn by motorized tractors and the like. The planters have conventionally been covered with a flexible web to secure the planter, but the flexible webs of a makeshift configuration have failed to prevent moisture and debris from contaminating seed contained within the seed containers of the planter organization. Covering organizations of the prior art are exemplified in U.S. patents including U.S Pat. No. 4,304,068 to Beder providing a collapsible terrarium for maintaining a controlled environment about potted plants. The terrarium is a tent-like enclosure of transparent construction to overlie and protect the underlying plants.

U.S. Pat. No. 2,728,115 to Cornelius sets forth a portable and collapsible building wherein a semi-cylindrical construction is provided, wherein the various pie-shaped segments of the semi-cylindrical housing interfit relative to one another to compact into a single pie-shaped segment for storage and transport thereof.

U.S. Pat. No. 1,692,229 to Smith illustrates a protective covering to overlie plants and the like of a generally semicylindrical construction.

U.S. Pat. No. 2,889,664 to Olshansky wherein a plant protective device utilizes a plurality of spaced hoops with a transparent water impermeable covering mounted thereover.

U.S. Pat. No. 3,418,752 to Stratton utilizes a protective covering to overlie and provide shading to plants and the like, wherein the covering is mounted upon cables that are manipulatable t extend and retract the covering.

As such, it may be appreciated that there continues to be a need for a new and improved agricultural planter and cover apparatus wherein the same addresses both the problems of ease of use, as well as effectiveness in construction to overlie and protect a tractor drawn planter during periods of non-use.

SUMMARY OF THE INVENTION

In view of the foregoing disadvantages inherent in the known types of cover apparatus now present in the prior art, the present invention provides an agricultural planter and cover apparatus wherein the same permits selective covering of the planter organization and retraction of the cover in a compact stored unit during periods of non-use. As such, the general purpose of the present invention, which will be described subsequently in greater detail, is to provide a new and improved agricultural planter and cover apparatus which has all the advantages of the prior art cover apparatus and none of the disadvantages.

To attain this, the present invention provides an apparatus including an agricultural planter, including a plurality of rotatable wheel members and an overlying support surface for securing a series of seed containers thereon. The apparatus includes a flexible impermeable cover web extending from a rear end framework member of the planter to overlie the planter and the associated containers. Flexible side flaps are provided preventing moisture and debris from entering the seed containers laterally thereof.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved agricultural planter and cover apparatus which has all the advantages of the prior art cover apparatus and none of the disadvantages.

It is another object of the present invention to provide a new and improved agricultural planter and cover apparatus which may be easily and efficiently manufactured and marketed.

It is a further object of the present invention to provide a new and improved agricultural planter and cover apparatus which is of a durable and reliable construction.

An even further object of the present invention is to provide a new and improved agricultural planter and cover apparatus which is susceptible of a low cost of manufacture with regard to both materials and labor, and which accordingly is then susceptible of low prices of sale to the consuming public, thereby making such agricultural planter and cover apparatus economically available to the buying public.

Still yet another object of the present invention is to provide a new and improved agricultural planter and cover apparatus which provides in the apparatuses and methods of the prior art some of the advantages thereof, while simultaneously overcoming some of the disadvantages normally associated therewith.

Still another object of the present invention is to provide a new and improved agricultural planter and cover apparatus wherein the same is readily extensible and alternatively retractable within an agricultural planter to afford protection on a selective basis to the planter organization.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein FIG. 1 is an isometric illustration of the instant invention.

FIG. 2 is an isometric illustration of the cover organization utilized by the instant invention.

FIG. 3 is an orthographic top view of the cover organization in a disassembled configuration.

FIG. 4 is an isometric illustration of the cover organization in relative association with the planter structure.

FIG. 7 is an isometric illustration of a further modified guide leg of FIG. 6 in association with the planar organization.

DESCRIPTION OF THE PREFERRED EMBODIMENT

Figure 5:
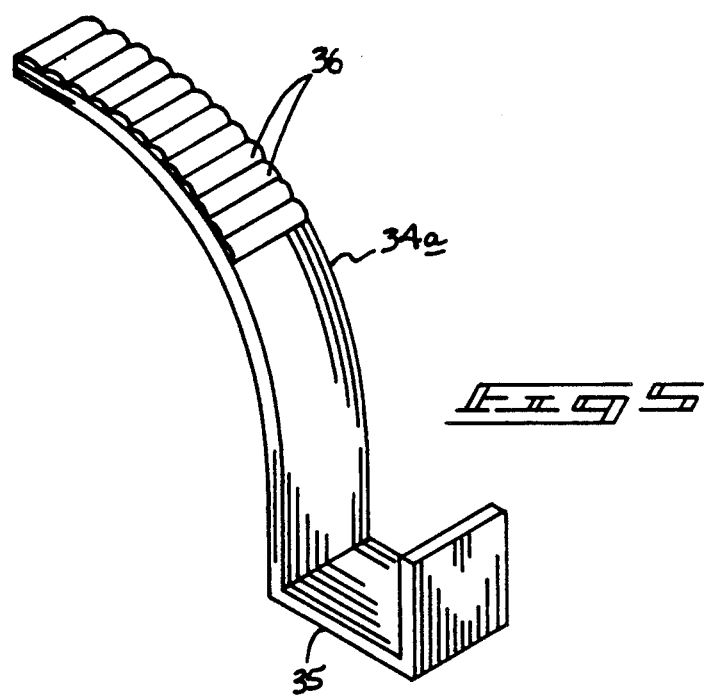
FIG. 5 is an isometric illustration of a modified guide leg utilized by the instant invention.

With reference now to the drawings, and in particular to FIGS. 1 to 7 thereof, a new and improved agricultural planter and cover apparatus embodying the principles and concepts of the present invention and generally designated by the reference numeral 10 will be described.

The agricultural planter and cover apparatus 10 of the instant invention essentially comprises a planter wagon 11 provided with spaced wheels, including at least an upper horizontal frame member 12 spaced from a lower horizontal frame member 12a (see FIG. 4). A support platform 13 is mounted overlying the wheels and forward of the frame members 12 and 12a (see FIG. 4). Seed containers 14 are mounted onto the support platform 13.

A horizontal cover support frame 15 is spaced adjacent the upper horizontal frame member 12, including spaced vertical containment legs 16 mounted rearwardly thereof, wherein the containment legs 16 underlie the horizon&al cover support frame 15 and include integral reinforcing legs directed rearwardly from lower terminal ends of each containment leg 16 onto the lower frame member 12a. A flexible fluid impermeable covering web 17 is of a finite width substantially equal to the length of the support platform 13, or somewhat greater than the support platform 13, to overlie the platform in a covering configuration, as illustrated in FIG. 1. A web anchoring loop 18 is formed in a surrounding relationship relative to the support frame 15 to thereby anchor the rear terminal portion of the web. A support axle 19 is fixedly mounted to and adjacent a forward edge 21 of the web 17, but spaced therefrom. The axle 19 includes a handle crank 20 integrally mounted thereto to assist in a rolling of the web subsequent to its use in a covering procedure. The forward web edge 21 includes a series of forward web apertures 22 mounted adjacent the forward edge between the axle 19 and the forward edge, as illustrated in FIG. 1. Left and right respective hook and loop fastener patches 23 and 24 are mounted adjacent the respective left and right web side edges 25 and 26 and the forward edge 21, as illustrated in FIG. 3 for example. These left and right hook and loop fastener patches 23 and 24 cooperate with respective left and right flap hook and loop fastener patches 29 and 30 to enclose the support platform 13, as illustrated in FIG. i, when the left and right side covering web flaps 27 and 28 respectively are directed downwardly and orthogonally relative to the platform 13, and are orthogonally oriented relative to the web 17, as illustrated in FIG. 1. The left and right hook and loop fastener patches 29 and 30 of the left and right web flaps 27 and 28 are mounted adjacent the forward side edges 27a and 28a respectively and contiguous the lower terminal edges of the web flaps to align with the left and right fastener patches 23 and 24 of the web 17. Left and right flap apertures 31 and 32 (see FIG. 3) are mounted adjacent the lowermost edges of the web side flaps 27 and 28 positioned rearwardly of the left and right respective hook and loop fastener patches 29 and 30. Web flap snap fasteners 33 are positioned in alignment adjacent an upper edge of each of the side flaps 27 and 28 and are selectively securable to the web snap fasteners 29 mounted adjacent &he left and right web side edges 25 and 26 (see FIG. 3). Securement hook members 40 mounted to flexible tether lines are each secured to each of the apertures 22 of the main web and 31 and 32 of the respective left and right web flaps 27 and 28. The hooks 40 permit securement of lowermost edges of the web side flaps and the main web to framework structure underlying the planter wagon 11, or selectively may be secured to surface supported stakes (not shown) to ensure the geometric integrity of the cover apparatus when positioned to overlie the planter wagon 11.

Arcuate guide legs 34 are mounted forwardly of the horizontal cover support frame 15 and spaced from and in alignment with the spaced vertical containment legs 16 to secure the web 17 in a retracted configuration, as illustrated in FIG. 4 for example. The arcuate guide legs 34 include "U" shaped lower terminal ends 35 to underlie the horizontal cover support frame and enhance securement of the guide legs thereto.

FIG. 5 illustrates a modified guide leg structure 34a utilizing rollers 36 mounted to overlie an upper surface of the modified guide legs 34a to enhance rolling and positioning of the web over the guide legs.

Figure 6:
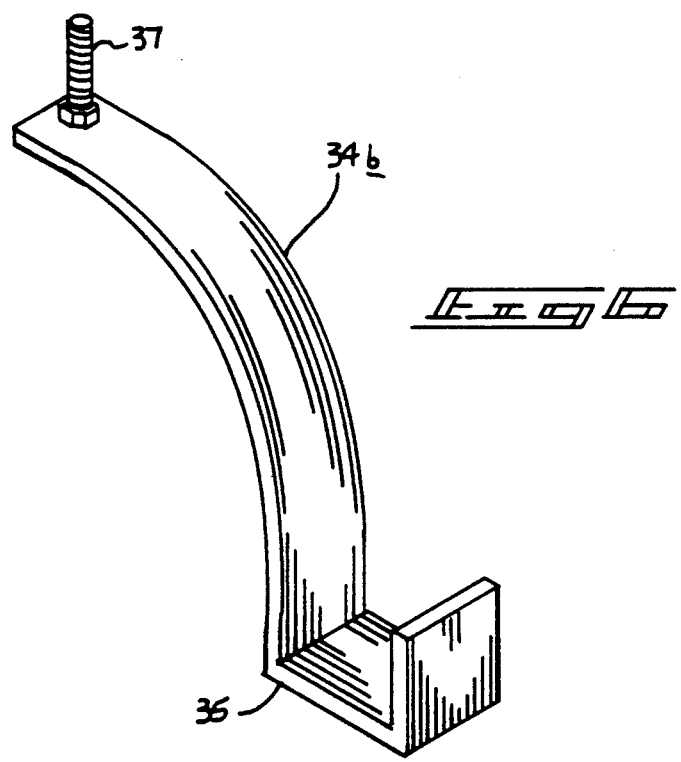
FIG. 6 is an isometric illustration of a further modified guide leg of the instant invention.

FIG. 6 illustrates a further modified guide leg structure 34b, wherein the guide legs each include a rod member 37 directed orthogonally and upwardly adjacent an upper terminal end of each of the guide legs. The rod members 37 are receivable within rod apertures 38 formed through the web adjacent the anchor loop 18 to enhance alignment of the web when positioned overlying the wagon 11, as illustrated in FIG. 7.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and opera&ion shown and described, and accordingly, all suitable modifications and equivalents may be resorted to, falling within the scope of the invention.

What is claimed as being new and desired to be protected by Letters Patent of the United States is as follows:

1. An agricultural planter and cover apparatus comprising, in combination,
   a planter wagon including a plurality of wheels rotatably mounted to the wagon, and
   the wagon including a support platform overlying the wheels, with an upper horizontal frame member and a lower horizontal frame member spaced rearwardly of the support platform, and the support platform including a plurality of seed containers mounted thereon, and
   a flexible horizontal covering web formed of water impermeable material mounted coextensively with and adjacent a rear edge of the support platform, the covering web rotatably mounted about a central axle, the central axle including a crank handle extending outwardly therefrom, and the central axle fixedly mounted to &he covering web adjacent a forward web edge of the covering web, and
   a horizontal cover support frame mounted rearwardly of the upper frame member and above the lower frame member, and
   a rear edge portion of the covering web mounted to the horizontal cover support frame.

2. An apparatus as set forth in claim I wherein the rear edge portion of the covering web includes an anchor loop, the anchor loop surroundingly encompassing the horizontal cover support frame.

3. An apparatus as set forth in claim 2 wherein the covering web is defined by a length to overlie the support platform and extends downwardly therefrom adjacent the wheels.

4. An apparatus as set forth in claim 3 wherein the covering web further includes a left and right web flap, the left and right web flap selectively securable to the covering web to overlie respective left and right side portions of the planter wagon.

5. An apparatus as set forth in claim 4 wherein upper edge portions of the respective left and right covering web flaps include snap fasteners, and the covering web includes further snap fasteners, the snap fasteners and covering web further snap fasteners selectively securable together.

6. An apparatus as set forth in claim 5 wherein the left and right web flaps each include covering web flap hook and loop fastener patches, and the covering web includes left and right covering web hook and loop fasteners selectively securable to the hook and loop web flap fasteners.

7. An apparatus as set forth in claim 6 wherein lower terminal edges of the left and right covering web flaps include a series of flap apertures directed therethrough, and the forward web edge includes a series of forward web edge apertures directed through the covering web adjacent the forward web edge between the forward web edge and the support axle, and each of the apertures including a flexible tether line mounted thereto, and wherein each flexible tether line includes a securement hook member mounted to the tether line spaced from each aperture.

8. An apparatus as set forth in claim 7 wherein the horizontal cover support frame includes a series of spaced, vertical containment legs directed orthogonally and upwardly relative to the horizontal cover support frame positioned rearwardly of the anchor loop of the covering web, and the horizontal cover support frame further includes a further series of arcuate guide legs positioned forwardly of the horizontal cover support frame and mounted thereto, each arcuate guide leg aligned with and positioned forwardly of each spaced vertical containment leg to secure the covering web therebetween when the covering web is in a rolled retracted configuration.

9. An apparatus as set forth in claim 8 wherein the arcuate guide legs include an arcuate upper surface extending forwardly of the horizontal cover support frame and above the support platform, and the upper surface of each arcuate guide leg includes a rod member extending orthogonally and upwardly relative to the upper surface, and the covering web includes a rod member aperture to receive a respective rod member from each arcuate guide leg therethrough.

10. An apparatus as set forth in claim 9 wherein each arcuate guide leg includes a series of rollers rotatably mounted to an upper surface of the arcuate guide legs.

* * * * *